US008660884B2

(12) United States Patent  (10) Patent No.: US 8,660,884 B2
Chen-Ritzo et al.  (45) Date of Patent: Feb. 25, 2014

(54) METHOD AND SYSTEM FOR ESTIMATING DEMAND IMPACT ON A FIRM UNDER CRISIS

(75) Inventors: Ching-Hua Chen-Ritzo, Mahopac, NY (US); Pawan Raghunath Chowdhary, Montrose, NY (US); Thomas Robert Ervolina, Poughquag, NY (US); Dharmashankar Subramanian, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1882 days.

(21) Appl. No.: 11/627,076

(22) Filed: Jan. 25, 2007

(65) Prior Publication Data

US 2008/0183550 A1   Jul. 31, 2008

(51) Int. Cl.
 *G06Q 10/00*  (2012.01)
 *G06Q 10/06*  (2012.01)

(52) U.S. Cl.
 CPC .............................. *G06Q 10/06375* (2013.01)
 USPC ....................................................... 705/7.37

(58) Field of Classification Search
 None
 See application file for complete search history.

(56) References Cited

U.S. PATENT DOCUMENTS

| | | | |
|---|---|---|---|
| 7,080,026 B2 * | 7/2006 | Singh et al. ................... 705/7.31 |
| 7,627,491 B2 * | 12/2009 | Feyen et al. ....................... 705/4 |
| 7,664,712 B1 * | 2/2010 | Duvall et al. ...................... 706/1 |
| 2002/0169657 A1 * | 11/2002 | Singh et al. ..................... 705/10 |
| 2002/0169658 A1 * | 11/2002 | Adler .............................. 705/10 |
| 2003/0149657 A1 * | 8/2003 | Reynolds et al. ............... 705/38 |
| 2004/0064436 A1 * | 4/2004 | Breslin et al. ..................... 707/1 |
| 2004/0199532 A1 * | 10/2004 | Meyers et al. ................ 707/100 |
| 2004/0236676 A1 * | 11/2004 | Takezawa et al. .............. 705/38 |
| 2004/0260703 A1 * | 12/2004 | Elkins et al. .................. 707/100 |
| 2005/0027571 A1 * | 2/2005 | Gamarnik et al. ................ 705/4 |
| 2005/0144062 A1 * | 6/2005 | Mittal et al. .................... 705/10 |
| 2005/0165633 A1 * | 7/2005 | Huber ............................... 705/8 |
| 2006/0009992 A1 * | 1/2006 | Cwiek et al. ..................... 705/1 |
| 2006/0085323 A1 * | 4/2006 | Matty et al. ..................... 705/38 |
| 2006/0224500 A1 * | 10/2006 | Stane et al. ..................... 705/38 |
| 2007/0005680 A1 * | 1/2007 | Jrad et al. ...................... 709/201 |
| 2007/0015506 A1 * | 1/2007 | Hewett et al. .............. 455/432.3 |
| 2007/0078861 A1 * | 4/2007 | Aidun ............................ 707/10 |
| 2007/0239496 A1 * | 10/2007 | Supatgiat et al. ................. 705/7 |
| 2007/0294766 A1 * | 12/2007 | Mir et al. ........................ 726/23 |
| 2008/0133299 A1 * | 6/2008 | Sitarski ............................. 705/7 |

OTHER PUBLICATIONS

Deleris LA and Erhun F (2005). Risk Management in Supply Networks Using Monte-Carlo Simulation. Proceedings of the 2005 Winter Simulation Conference. 1643-1649.*

(Continued)

*Primary Examiner* — Brett Feeney
(74) *Attorney, Agent, or Firm* — Whitham, Curtis, Christofferson & Cook, P.C.; Daniel P. Morris

(57) ABSTRACT

Market demand is estimated for a firm under crisis, beginning with an operational demand forecast of a firm as input, correcting that forecast to account for the impact of a pandemic or other extraordinary market-disrupting circumstance, and providing a corrected operational demand forecast as output. The correction to account for the impact of an extraordinary market-disrupting circumstance is based on an estimated economic impact of the disruption and an estimated reduction of the firm's sales force attributable to the disruption.

16 Claims, 4 Drawing Sheets

Nominal Demand Estimate, from Operational Data

Correction for different exposures to different economic sectors

Correction for reduction in sales force availability $$V_{b,c,i}^{t,Adjusted} = V_{b,c,i}^{t} * \left(1 - \sum_{s \in S} \left(\alpha_{s,b,c,i} f(\Delta E_{s,c,t})\right)\right) * \left(1 - g\left(\sum_{\text{Sales Hubs}(c)} \Delta S_{c,t}\right)\right)$$

Linear Embodiment :

$$f(\Delta E_{s,c,t}) = \beta_{b,s}(\Delta E_{s,c,t})$$

$$g\left(\sum_{\text{Sales Hubs}(c)} \Delta S_{c,t}\right) = \gamma_{b,c,i}\left(\sum_{\text{Sales Hubs}(c)} \Delta S_{c,t}\right)$$

Business, b; Country, c; Brand, i; Sector s
S is the set of all market sectors (Telecom, Banking, Pharma, etc.)
$\alpha_{s,b,c,i}$ : Revenue(or Volume) fraction of brand i, of business b, in country c, in sector s
$\beta_{b,s}$ : Sensitivity of Demand for products in business b, in sector s, to changes in gross output of sector s
$\Delta E_{s,c}$ : Estimated change in Gross Output of sector s, in country c
$\gamma_i$ : Sensitivity of demand to change in Sales force availability, for brand i
$\Delta S_c$ : Estimated change in sales force availability in country c
$V_{b,c,i}^{t}$ : Operational Demand Forecast, time t, brand i, in business b, and country c. This is assumed to include any growth plans.
$V_{b,c,i}^{t,pandemic}$ : Operational Demand Forecast, time t, brand i, in business b, and country c

(56) References Cited

OTHER PUBLICATIONS

ON Semiconductor Implements Global IT Recovery Capability; Recovery Plan Protects Mission-Critical IT Functions. Business Editors/High-Tech Writers. Business Wire. New York: Jul. 16, 2001. p. 1.*

Rothstein Catalog on Distaster Recovery Software and Templates (2006). pp. 1-10.*

Supply Chain Response to Terrorism: Creating Resilient and Secure Supply Chains (2003). MIT Center for Transportation and Logistics. pp. 1-59.*

Analytical Methods for Modeling Pandemic Flu (2007). RMS. The World Bank. pp. 1-70.*

Phoenix the Plan Builder Emergency Response Planning User's Manual (2004). Binomial International Inc. pp. 1-75.*

Risk Management Solutions Estimates a 20% Probability of Next Influenza Pandemic Being Worse Than 1918 Outbreak RMS Releases First Probabilistic Model for Assessing Pandemic Influenza Risk (2006). Press Release. pp. 1-2.*

Preparing for Pandemic William Hoffman. Traffic World. Newark: Apr. 17, 2006. pp. 1-3.*

SunGard pandemic response Checklist (2008). SunGard. pp. 1-4. Noting offered pandemic response planning service prior to the filing date of the instant application.*

Inoculating business against avian flu Thomas W Barritt. Public Relations Tactics. NewYork: Jul. 2006. vol. 13, Iss. 7; p. 21, pp. 1-3.*

When disaster strikes: Ensuring business continuity in the face of a pandemic (2006). Grub & Ellis. pp. 1-4.*

Pandemic Influenza Preparedness, Response, and Recovery Guide for Critical Infrastructure and Key resources (2005). Homeland Security. pp. 1-85.*

Tomlin B (2006). On the Value of Mitigation and Contingency Strategies for Managing Supply Chain Disruption Risks (2006). Management Science; May 2006; 52(5): 639-657.*

Google Answers Pandemic Threat Screenshot.*

Business Continuity and Disaster Recovery Planning and Management: Perspective (2001). Technology Overview. Gartner Research. pp. 1-15.*

Binomial Research Screenshot from webarchive.org Dec. 16, 2006.*

CSL FluPlanner Screenshot (2006). Citris Solutions Ltd.*

Snyder LV, Scaparra MP, Daskin MS, and Church RL (2006). Planning for Disruption in Supply Chain Networks. Operations Research. pp. 234-257.*

Roberts J (2004). Risk and Insurance Top 10 Risks. Risk and Insurance. pp. 1-24.*

Pandemic Flu UK Health Departments UK Influenza Pandemic Contingency Plan (2005). pp. 1-77.*

FluPlanner: pandemic modeling software screenshot from Mar. 2006.*

The Camden Flu Pandemic Game (2006). Camden Primary Care Trust. pp. 1-23.*

BPPS User Manual (2009 version). Binomial International. pp. 1-64.*

Pandemic Management Team. Avian Influenza Pandemic Business Continuity Planning Guide (2006). Loyola University. pp. 1-52.*

Pandemic influenza Exploding the myths (2006). Aon. Risk Bulletin. pp. 1-28.*

Ralf L Itzwerth, C Raina MacIntyre, Smita Shah and Aileen J Plant (2006). Pandemic influenza and critical infrastructure dependencies: possible impact on hospitals. 185(10): 70-72.*

Ruslan A. Klimov and Yuri A. Merkuryev (2006). Simulation-Based Risk Measurement in Supply Chains. Proceedings 20th European Conference on Modeling and Simulations. ECMS. pp. 1-6.*

Miler HE, Engemann KJ and Yager RR (2006). Disaster Planning and Management. Communications of the IIMA. 6(2): 25-36.*

Chopra S and Sodhi MA (2004). MIT Sloan Management Review. Fall. 53-61.*

Semini M and Fauske H (2006). Proceedings of the 2006 Winter Simulation Conference. 1946-195.*

Kleindorfer PR and Saad GH (2005). Managing Disruption Risks in Supply Chains. Production and Operations Management. 14(1): 53-68.*

Sheffi Y (2001). Supply Chain Management under the Threat of International Terrorism. The International Journal of Logistics Management. 12(2): 1-11.*

Deleris LA, Elkins D and Pate-Cornall ME (2004). Proceedings of the 2004 Winter Simulation Conference. 1384-1391.*

Enderwick P (2006). Managing the new global threats. University of Auckland Business Review. 63-72.*

* cited by examiner

Figure 1

Nominal Demand Estimate, from Operational Data

Correction for different exposures to different economic sectors

Correction for reduction in sales force availability $$V_{b,c,i}^{t,Adjusted} = V_{b,c,i}^{t} * \left(1 - \sum_{s \in S}\left(a_{s,b,c,i} f(\Delta E_{s,c,t})\right)\right) * \left(1 - g\left(\sum_{Sales\ Hubs(c)} \Delta S_{c,t}\right)\right)$$

Linear Embodiment:

$$f(\Delta E_{s,c,t}) = \beta_{b,s}(\Delta E_{s,c,t})$$

$$g\left(\sum_{Sales\ Hubs(c)} \Delta S_{c,t}\right) = \gamma_{b,c,i}\left(\sum_{Sales\ Hubs(c)} \Delta S_{c,t}\right)$$

Business, b; Country, c; Brand, i; Sector s
S is the set of all market sectors (Telecom, Banking, Pharma, etc.)
$a_{s,b,c,i}$: Revenue(or Volume) fraction of brand i, of business b, in country c, in sector s
$\beta_{b,s}$: Sensitivity of Demand for products in business b, in sector s, to changes in gross output of sector s
$\Delta E_{s,c}$: Estimated change in Gross Output of sector s, in country c
$\gamma_i$: Sensitivity of demand to change in Sales force availability, for brand i
$\Delta S_c$: Estimated change in sales force availability in country c
$V_{b,c,i}^{t}$: Operational Demand Forecast, time t, brand i, in business b, and country c
$V_{b,c,i}^{t,pandemics}$: Operational Demand Forecast, time t, brand i, in business b, and country c. This is assumed to include any growth plans.

Comparison of product demand under baseline conditions and estimated product demand under disaster conditions Sample Output: Forecasting Effect of Disaster on Demand

METHOD AND SYSTEM FOR ESTIMATING DEMAND IMPACT ON A FIRM UNDER CRISIS

BACKGROUND OF THE INVENTION

1. Field of the Invention

The present invention relates to the estimation of changes in demand resulting from the impact of extraordinary market-disrupting circumstances, including, but not limited to, the impact of a pandemic or other crisis.

2. Background Description

Models for demand estimates (i.e., forecasts) for various products and services in supply chain analyses are traditionally based on operational supply chain data. In the traditional operational view of demand, historical time-series data of multiple streams (including, but not limited to, shipments data, point-of-sale data, customer order data, and return data) is used in conjunction with various forecasting algorithms, making allowance for scenarios such as special promotional events and the like. Such models may be expected to be sufficient for nominal conditions, as they use nominal, historical, time-series data. Such models may not, however, be suitable for forecasting demand under extraordinary conditions, since those are conditions to which historically-derived data tends not to be applicable, by definition.

A firm's nominal demand profile that is estimated using operational methods is affected by its exposure to various economic sectors in different geographic regions. As a result, there is a need to combine a market research view and an operational view to estimate demand under conditions of extraordinary, disruptive, crisis circumstances, including, but not limited to, a pandemic or other crisis. Furthermore, the prior art does not address the dependence of market demand in supply chain models on a firm's sales force availability. Thus, prior art methods of estimating demand fail to model the simultaneous effects of:

1. an inherent sensitivity to reduced level of outputs in the various economic sectors in different geographic regions that make up the nominal demand, along with,
2. an inherent sensitivity to the availability (or nonavailability) of sales force personnel, both of which may be significantly impacted by a pandemic or other extraordinary, disruptive, crisis circumstance, or
3. the presence of mitigation policies that may lead to additional adjustment of the demand estimation.

SUMMARY OF THE INVENTION

The present invention seeks to provide estimates of the impact of crises and other extraordinary situations on the demand of a firm without relying exclusively on historical data which may have no relevance to the circumstances of one particular crisis situation or another. This is accomplished using a demand model that extends and adapts traditional demand forecasting for supply chain analyses to capture effects resulting from such economic upturns and downturns and changes in sales force availability associated with extraordinary situations including, but not limited to, pandemics. Such extraordinary circumstances may introduce various effects on demand which are not modeled in traditional demand estimation approaches. A pandemic, for example, may lead to various sorts of downturns and/or upturns in economic indicators in different market sectors, and in different geographic regions. These indicators could be macroeconomic (such as GDP, Gross Output, etc.), or microeconomic (such as expected reduction in the economic output (revenue) of a select set of specific corporations (companies)). A pandemic may also lead to reduced availability of sales forces.

In strategic market research, experts study firms' market shares and opportunities for growth in various economic sectors using financial performance data. Taking the example of modeling demand under the circumstances of a pandemic, a firm's nominal demand profile, estimated using traditional methods, would be affected by exposure to various economic sectors in different countries. It is thus necessary to combine a market research view and an operational view to produce a useful estimate of demand under pandemic conditions.

A demand model according to the present invention thus considers at least the following three factors:

Nominal time-stamped demand profile from operational forecasting;

Market analysis and financial data showing the extent of exposure to each economic sector for each brand of product and/or service in each country; and Dependence on sales force availability.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is an equation used in the practice of this invention.

DETAILED DESCRIPTION OF THE PREFERRED EMBODIMENTS OF THE INVENTION

Figure 2:
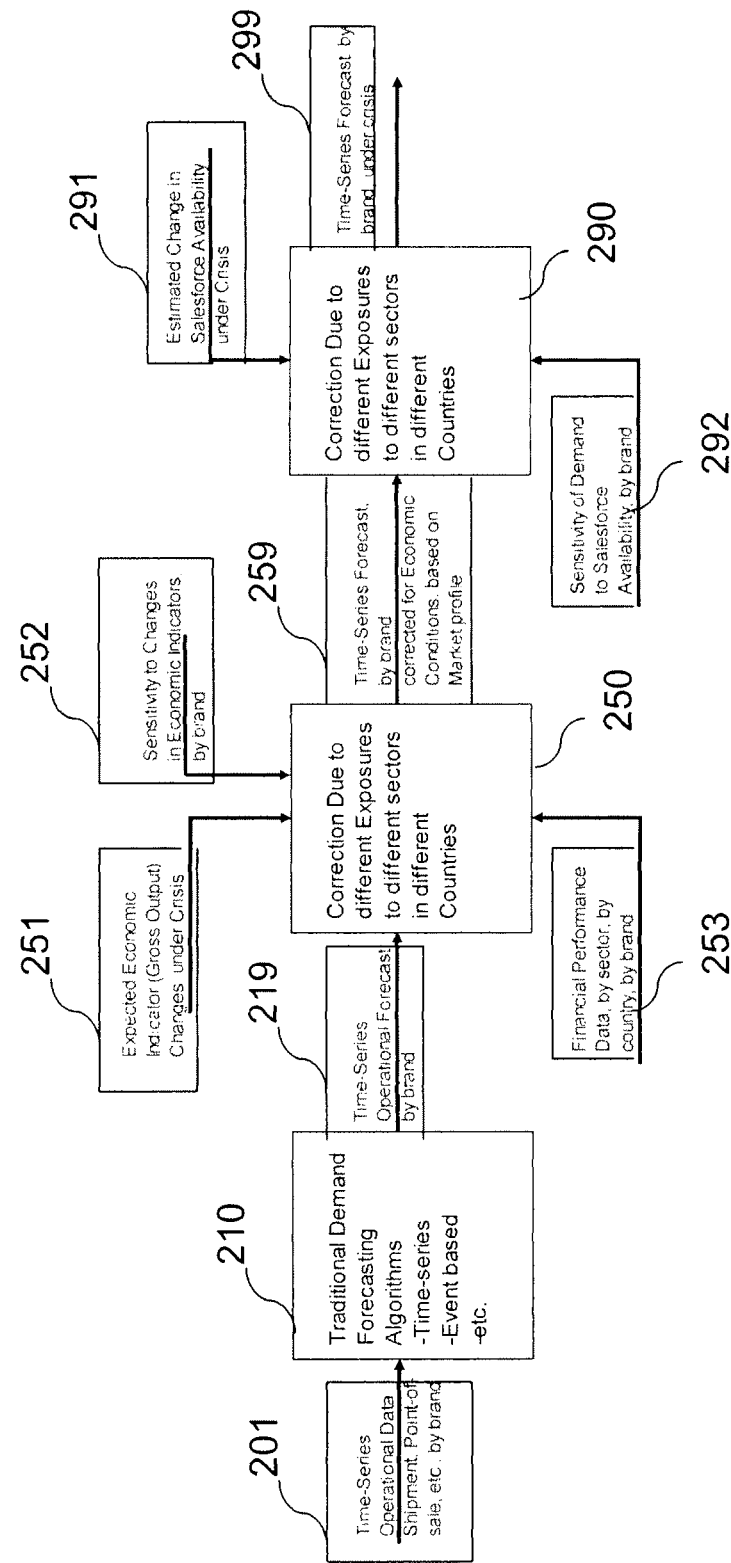
FIG. 2 shows the production of a time-series operation forecast by brand according to the present invention.

In mathematical terms, the demand model equation used in the practice of this invention takes the form shown in FIG. 1.

Function B:

This function estimates the baseline demand as a function of the nominal operational forecast from time period t, as well as additional dependence on pandemic adjusted forecasts from history (i.e. time periods, t-1, t-2, . . . ). This function captures the dependencies of demand across time-periods. A simplistic embodiment of function B could output just the nominal operational forecast from time period, t, and ignore dependence across time-periods.

Function f:

This function captures the first correction to the estimated baseline demand, due to different exposures to different economic sectors. It includes dependence on changes in economic indicators in the difference sectors, in the country c, under question, as well as changes in the economic indicators in a set of other geographies that can be defined in the set, Econ_Hubs(c). Like-wise, it includes these changes in the economic indicators at time-period, t, as well as the changes in the economic indicators in previous time periods (i.e., t-1, t-2, . . . ).

Function g:

This function captures the second correction to the estimated baseline demand, due to changes in sales-force availability. It includes changes in the sales force availability in the country, c, under question, as well as changes in the sales force availability in a set of other geographies that can be defined in the set, SalesHubs(c). Likewise, it includes these changes in the sales force availability at time period t, as well as the changes in the sales-force availability in previous time periods (i.e., t-1, t-2, ... ).

Together, the equation in FIG. 1 shows that the economic impact may include estimated economic effects spanning one or more geographies (countries) and one or more time periods, as well as multiple economic sectors in each geography and time period, taking into account any dependencies between geographies and time periods. Similarly, the reduction in the firm's sales force may include effects of estimated reduction of said firm's sales force spanning multiple geographies (countries, cities) and multiple time periods, taking into account any dependencies between geographies and time periods.

The crisis-adjusted demand profile is contained in $\{V_{b,c,i}^{t,Adjusted}\}$, after correcting the baseline demand profile for economic and sales force dependencies. One approach would take the form of linear dependency with sensitivities (as shown in the example equations as a linear embodiment). There are relatively easy extensions to a more detailed dependency, such as piece-wise linear sensitivities. Economic sensitivity ($\beta_{b,s}$) can be estimated by experts in industry economics, for business b, and sector s. Sales force sensitivity ($\gamma_{b,c,i}$) can be estimated by performing sales force analytics.

Thus, according to the present invention, there is provided a method and a system for a computer or other data processing apparatus (including, but not limited to, a data processing apparatus programmed with instructions from a machine-readable storage medium) to estimate market demand by: using a computer to receive as input an operational demand forecast for a firm under normal, non-extraordinary (nominal) circumstances; correcting said firm's operational demand forecast to account for the impact of an extraordinary disruptive crisis circumstance, based on (i) an estimated economic impact of said extraordinary disruptive crisis circumstance and (ii) an estimated reduction of said firm's sales force attributable to said extraordinary disruptive crisis circumstance; and providing said corrected operational demand forecast as output. The economic impact may include estimated economic effects spanning one or more geographies (countries) and one or more time periods, as well as multiple economic sectors in each geography and time period, taking into account any dependencies between geographies and time periods. The reduction in the firm's sales force may include effects of estimated reduction of said firm's sales force spanning multiple geographies (countries, cities) and multiple time periods, taking into account any dependencies between geographies and time periods. The said extraordinary, disruptive, crisis may be an epidemiological disaster or pandemic. The step of correcting the firm's operational demand forecast to account for the impact of extraordinary disruptive crisis circumstance, may also based on the presence of one or more mitigation policies which lead to additional adjustment of the demand estimation.

The present invention may also be employed to focus on a specific set of customers (or corporations) who make up the firm's demand, along with the extent of exposure of the firm's demand to each specified customer instead of a set of economic sectors that make up the firm's demand, along with extent of exposure of the firm's demand to each economic sector in each geography. Here, instead of using macroeconomic indicators such as Estimated Gross Output Change in each economic sector and/or in each geography, a microeconomic indicator such as Estimated Revenue Change for each customer (corporation) would be employed.

FIG. 2 shows traditional demand forecasting algorithms receiving time-series operational data by brand 201 as input in step 210 and producing time-series operation forecast by brand 219 as output. This output 219 is then corrected according to the present invention in step 250 to accommodate different exposures to different economic sectors in different geographic regions, accounting for expected changes in the economic indicators for each economic sector under extraordinary, disruptive, crisis-circumstances 251, sensitivity to changes in the economic indicators for each economic sector by brand 252, and financial performance by sector, country and brand 253, which produces a corrected time-series forecast 259 as output. This corrected output 259 is then further corrected in step 290 to accommodate sales force dependency in view of sales force availability changes 291 and sensitivity of demand to sales force availability 292, which produces an adjusted time-series forecast by brand 299.

Figure 3:
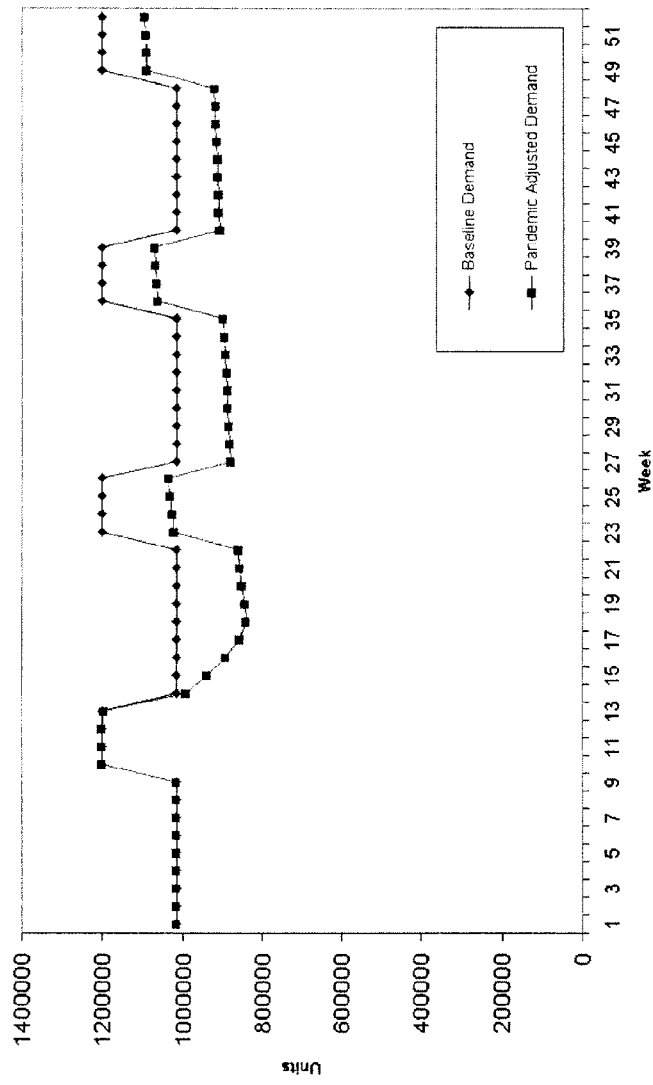
FIG. 3 shows a sample output assessing the effect of disaster on demand according to the present invention.

FIG. 3 shows a sample output forecasting the effect of disaster on demand according to the present invention. FIG. 3 shows a 52-week baseline demand (i.e. demand under nominal conditions) for an illustrative product, and compares it with the corresponding disaster-adjusted demand (i.e. estimated demand under the effects of a disaster for the 52-week duration).

Figure 4:
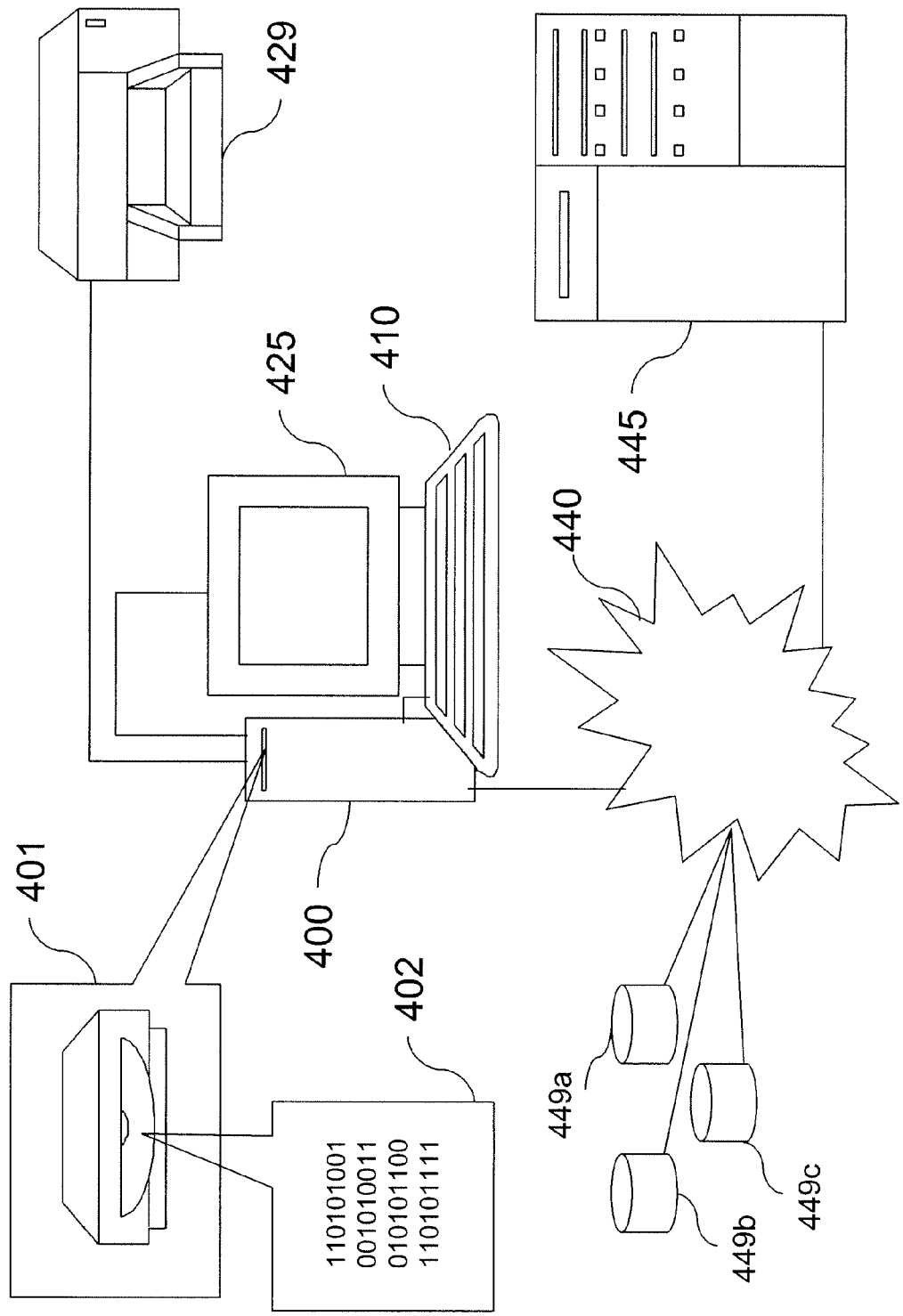
FIG. 4 shows a system according to the present invention.

FIG. 4 shows a computer 400 with a machine-readable medium 401 containing machine-readable instructions 402 for the computer 400 to receive and correct a firm's baseline operational demand forecast data and output the result. Said computer 400 receives operator instructions via a keyboard 410. The computer 400 obtains the baseline operational demand forecast data via the network 440, either directly from databases 449a, 449b, 449c or from a server 445 obtaining the baseline operational forecast data from databases 449a, 449b, 449c. The computer 400 then corrects the firm's baseline operational demand forecast to account for the impact of a crisis and provides a corrected operational demand forecast as output either in human-readable format via a computer screen 425 or printer 429 or in machine-readable format over the network 440 as input to the server 445.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method of estimating market demand in the event of a crisis, comprising the steps of:
  receiving by a computer an operational demand forecast for a firm under normal circumstances;
  correcting by a computer said firm's operational demand forecast to account for the impact of a crisis based on both:
    an estimated economic impact of said crisis, and
    an estimated reduction of said firm's sales force attributable to said crisis;
  wherein said correcting step utilizes an algorithm which multiplies a value representative of a nominal demand estimated from operational data by both a value which is representative of a correction for different exposures to different economic sectors and a value which is a correction for reduction in sales force availability; and
  providing by a computer said corrected operational demand forecast as output.

2. The method of claim 1, wherein said estimated economic impact includes an estimated economic effect spanning one or more of a geography and a time period; and
one or more of economic sectors in at least one of
    a geography,
    a time period, and
    a dependency between a geography and a time period.

3. The method of claim 1, wherein said estimated reduction in the firm's sales force includes an effect of an estimated reduction of said firm's sales force spanning one or more of
    a geography,
    a time period, and
    a dependency between a geography and a time period.

4. The method of claim 1, wherein said crisis is an epidemiological crisis.

5. The method of claim 1, wherein the said step of correcting by a computer said firm's operational demand forecast is based on one or more mitigation policies.

6. A computer implemented system for estimating market demand in the event of a crisis, comprising:
    one or more computers configured to receive an operational demand forecast for a firm under normal circumstances;
    the one or more computers configured to correct said firm's operational demand forecast to account for the impact of a crisis based on both:
        an estimated economic impact of said crisis, and
        an estimated reduction of said firm's sales force attributable to said crisis;
    wherein said correcting step utilizes an algorithm which multiplies a value representative of a nominal demand estimated from operational data by both a value which is representative of a correction for different exposures to different economic sectors and a value which is a correction for reduction in sales force availability; and
    the one or more computers configured to provide said corrected operational demand forecast as output.

7. The system of claim 6, wherein said estimated economic impact includes an estimated economic effect spanning
    one or more of a geography and a time period; and
    one or more of economic sectors in at least one of
        a geography,
        a time period, and
        a dependency between a geography and a time period.

8. The system of claim 6, wherein said estimated reduction in the firm's sales force includes an effect of an estimated reduction of said firm's sales force spanning one or more of
    a geography,
    a time period, and
    a dependency between a geography and a time period.

9. The system of claim 6, wherein said crisis is an epidemiological crisis.

10. The system of claim 6, wherein a correction of said firm's operational demand forecast generated by said computer is based on one or more mitigation policies.

11. A non-transitory machine readable medium, having machine-readable instructions stored thereon for estimating market demand in the event of a crisis, the machine-readable instructions upon execution instructing one or more computers to:
    receive as input an operational demand forecast for a firm under normal circumstances;
    correct said firm's operational demand forecast to account for the impact of a crisis based on both:
        an estimated economic impact of said crisis, and
        an estimated reduction of said firm's sales force attributable to said crisis;
    wherein said instructions to correct said firm's operational demand forecast includes an algorithm which multiplies a value representative of a nominal demand estimated from operational data by both a value which is representative of a correction for different exposures to different economic sectors and a value which is a correction for reduction in sales force availability; and
    provide said corrected operational demand forecast as output.

12. The non-transitory machine readable medium of claim 11, wherein said estimated economic impact includes an estimated economic effect spanning
    one or more of a geography and a time period; and
    one or more of economic sectors in at least one of
        a geography,
        a time period, and
        a dependency between a geography and a time period.

13. The non-transitory machine readable medium of claim 11, wherein said estimated reduction in the firm's sales force includes an effect of an estimated reduction of said firm's sales force spanning one or more of
    a geography,
    a time period, and
    a dependency between a geography and a time period.

14. The non-transitory machine readable medium of claim 11, wherein said crisis is an epidemiological crisis.

15. The non-transitory machine readable medium of claim 11, wherein the machine-readable instructions for using a computer to correct said firm's operational demand forecast are based on one or more mitigation policies.

16. A computer implemented method of estimating market demand in the event of a crisis, comprising the steps of:
    receiving by a computer an operational demand forecast for a firm under normal circumstances;
    correcting by a computer said firm's operational demand forecast to account for the impact of a crisis based on an estimate selected from the group consisting of:
    economic impact of said crisis and an estimated reduction of said firm's sales force attributable to said crisis;
    wherein said correcting step utilizes an algorithm which multiplies a value representative of a nominal demand estimated from operational data by both a value which is representative of a correction for different exposures to different economic sectors and a value which is a correction for reduction in sales force availability; and
    providing by a computer said corrected operational demand forecast as output.

* * * * *